Figure 2:
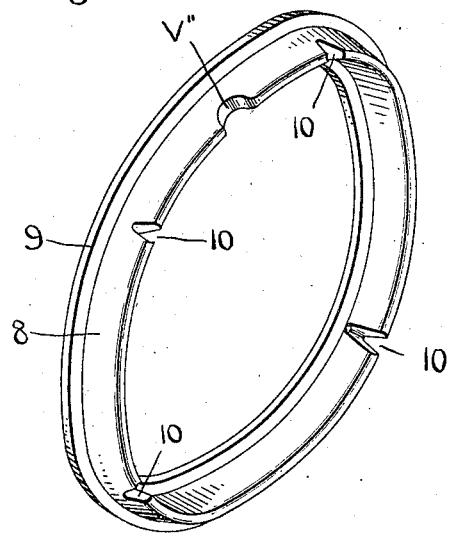

E. L. GOLD & J. H. MESSINGER.
DEMOUNTABLE RIM.
APPLICATION FILED MAY 2, 1912.
1,045,018.
Patented Nov. 19, 1912.
2 SHEETS—SHEET 1.
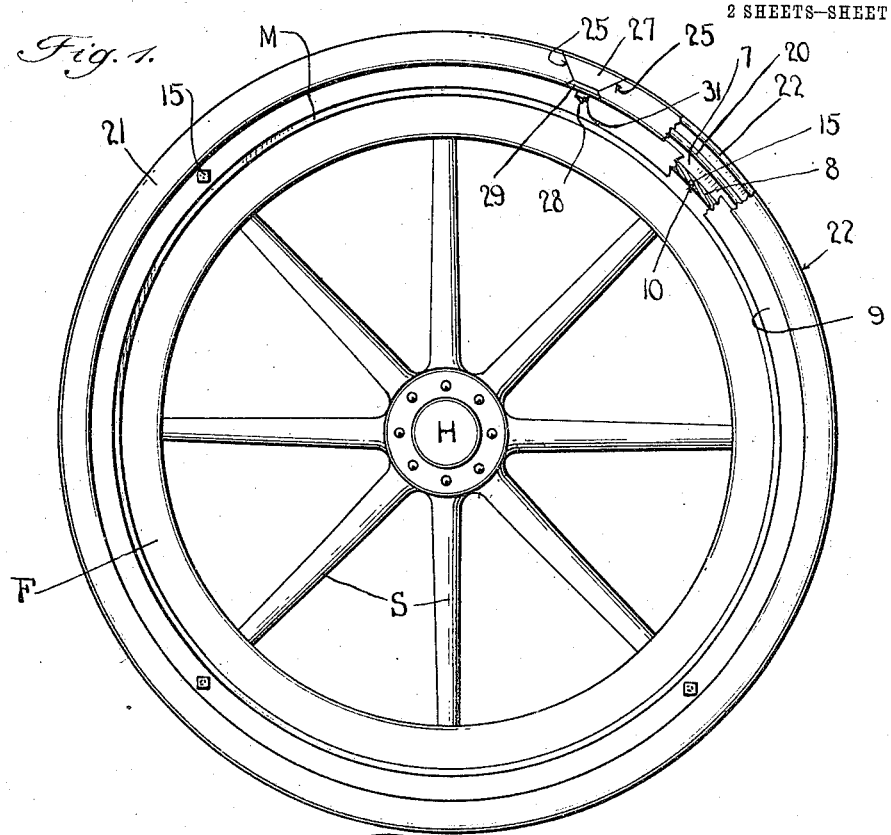
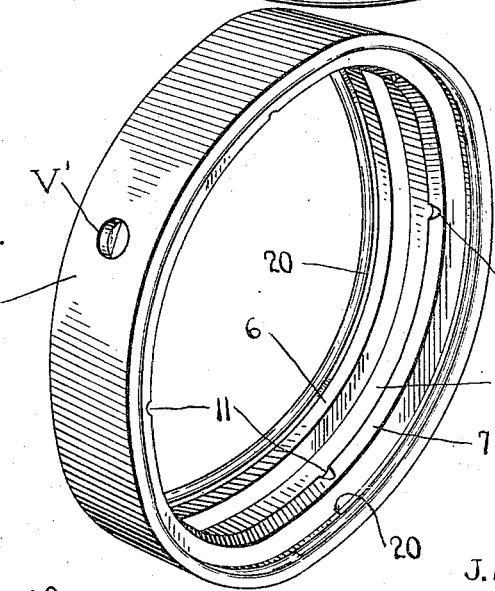
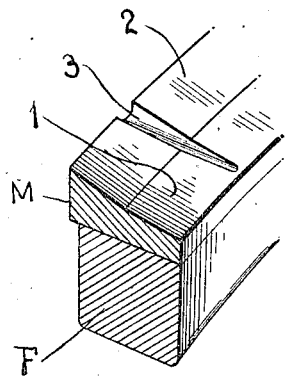
Witnesses
L. B. James
N. L. Collamer
Inventors
E. L. Gold &
J. H. Messinger
by H. B. Willson &co
Attorneys

E. L. GOLD & J. H. MESSINGER.
DEMOUNTABLE RIM.
APPLICATION FILED MAY 2, 1912.

1,045,018.

Patented Nov. 19, 1912.

2 SHEETS—SHEET 2.

Witnesses
L. B. James
N. L. Collamer

Inventors
E. L. Gold &
J. H. Messinger
by H. B. Willson & Co.
Attorneys

UNITED STATES PATENT OFFICE.

EDGAR L. GOLD AND JACOB H. MESSINGER, OF NAZARETH, PENNSYLVANIA.

DEMOUNTABLE RIM.

1,045,018.  Specification of Letters Patent. Patented Nov. 19, 1912.

Application filed May 2, 1912. Serial No. 694,787.

*To all whom it may concern:*

Be it known that we, EDGAR L. GOLD and JACOB H. MESSINGER, citizens of the United States, residing at Nazareth, in the county of Northampton and State of Pennsylvania, have invented certain new and useful Improvements in Demountable Rims; and we do declare the following to be a full, clear, and exact description of the invention, such as will enable others skilled in the art to which it appertains to make and use the same.

This invention relates to wheels such as are usually employed upon automobiles and other motor vehicles, and more especially to those wherein the rim is removable from the stationary metal band on the felly of the wheel proper; and the object of the same is to produce an improved means for attaching the rim to the metal band so that it may be demounted bodily with its tire. This object is accomplished by the construction set forth in the following specification and claim, and shown in the drawings wherein—

Figure 4:
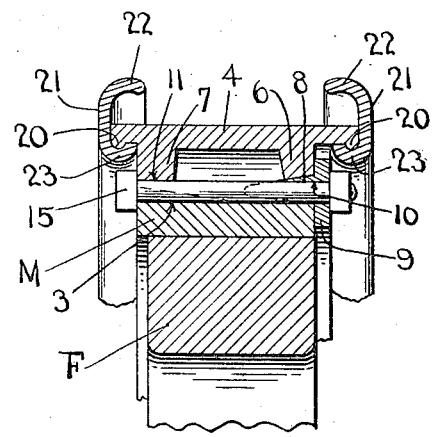
Figure 5:
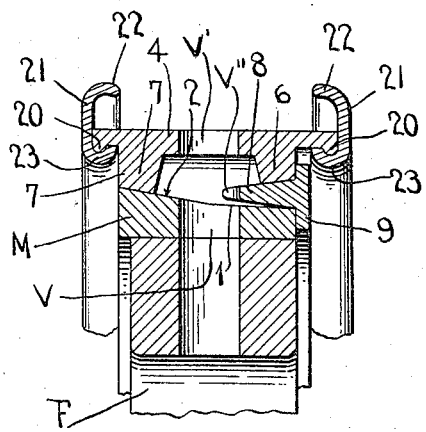
Figure 7:
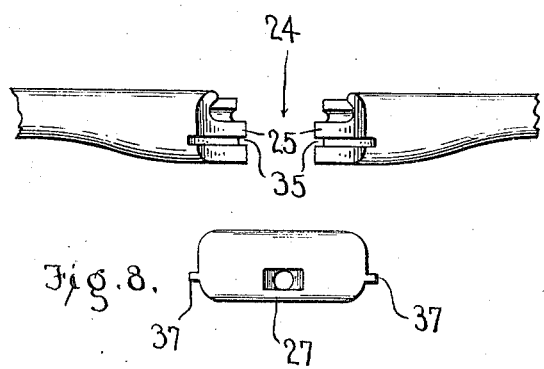
Figure 8:
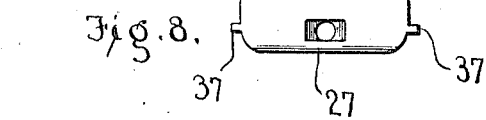

Figure 1 is an elevation of the wheel when viewed from the inside, certain parts being broken away. Fig. 2 is a perspective detail of the fastening ring and its fin. Fig. 3 is a perspective detail of the band, illustrating the beads with which its interior is provided. Figs. 4 and 5 are enlarged cross sections through the rim and its flanges, taken respectively through one of its bolts and between two of said bolts. Fig. 6 is an enlarged sectional detail of a portion of the felly and its band. Fig. 7 is a plan view of the two ends of one of the flanges; and Fig. 8 is a similar view of the block intended to be inserted between them.

In the drawings the letter H designates the hub and S the spokes of an ordinary automobile wheel whose felly F is by preference made of wood surrounded with a metal band M as shown in Fig. 6 and having a valve hole V. No novelty is claimed for these parts, but the outer face of the band is shaped to coact with the rim so that the latter, carrying the tire, may be attached to or removed from said band in the manner set forth below.

Coming now more particularly to the details of the present invention, the radially outer face of the band M is formed flat or nearly so for about half of its width as shown at 1, and slightly flaring or conical for the other half of its width as shown at 2, and through the flaring portion and possibly extending slightly into the other portion are cut four transverse grooves or notches 3 for a purpose to appear. The demountable rim is made up of a rather wide metal band 4 preferably flat on its outer face for the reception of the tire which may be held thereon by any suitable means, and having its inner face provided with beads which are shaped as best seen in Figs. 4 and 5. One of these we call the plain bead 6 and the other the beveled bead 7. The latter is intended to coact with the flaring portion 2 of the band M, whereas the internal circumference of the plain bead is less than the external circumference of the relatively flat portion 1 of said band, and between these parts may be passed the thinner portion or "fin" 8 of a ring whose flat body 9 is of a size to come up against the outer face of the plain bead 6 as seen in Fig. 4. The body and the fin of this ring are provided with openings 10 at proper points, and the beveled bead 7 with notches 11 also at proper points to register with the notches 3 in the periphery of the band, and through the registering openings and notches are passed bolts 15 for holding all parts together. The band has a radial opening V' and the inner edge of the fin a notch V" through which passes the valve of the inner tube in a manner which will be clear.

When this demountable rim is to be applied to a wheel, it is passed over the same until the beveled inner face of the bead 7 contacts with the beveled outer face of the flaring portion 2 of the band M, care being taken to have the holes V and V' in register and the four notches 3 and 11 in register in a manner well understood by the autoist. The ring 9 is then applied, its fin 8 passing between the flat portion 1 and the inner edge of the plain bead 6, and here again the notch V" will come opposite the alined holes through which projects the valve of the tire. The four bolts are now inserted through the registering openings in the ring and notches in the other members, and their nuts applied and tightened up, and as strain is put upon the bolts the tapering or wedge-shaped fin 8 is drawn forcibly between the contiguous faces of the parts which it separates and therefore caused to hold this side of the rim tight around the felly and metal band, while simultaneously the beveled face of the other bead and the flaring portion of the band are also drawn into forcible contact and the parts are braced at this side of the wheel. Hence it will be seen that the simple tightening up of four bolts reliably locks the rim upon the wheel so as to prevent its dislodgment in either direction and also to prevent it from creeping.

While the tire may be held on the rim by any suitable means, we preferably provide rim along each edge with an inwardly projecting rib 20 under which may be hooked the rib 23 along the inner edge of a flange 21 whose outer edge is inturned at 22 so as to engage the tire casing. There are by preference two such removable flanges, each formed in the shape of a ring split as seen at the point 24 in Fig. 7, and for distending each ring after it is put in place we preferably use an outer wedge-shaped block 27 and an inner and similar block 29, both pierced for the passage of a bolt 28 having a nut 31 at its inner end. The undercut extremities of the outer block move on the ends 25 of the ring which are beveled and preferably grooved as at 35 to receive tongues 37 on said block to prevent the latter from lateral dislocation. However, it will be understood that any suitable form of rim and its flanges may be employed and if the flanges are detachable any suitable form of spreader may be employed for distending them when they are applied to the rim.

What is claimed as new is:

In a wheel having a demountable rim, the combination with the felly, and a band around it whose periphery is flat at one side and flaring at the other and provided with transverse notches; of the rim comprising a flat band having an internal beveled bead at one edge adapted to contact with the flaring portion of the band and a plain bead at the other edge whose internal diameter is greater than the external diameter of the flat portion of the band, a fastening ring having an axially projecting fin adapted to be passed between said plain bead and the flat portion of the band and pierced with openings registering with said notches, and bolts removably engaging the openings and notches.

In testimony whereof we have hereunto set our hands in presence of two subscribing witnesses.

EDGAR L. GOLD.
JACOB H. MESSINGER.

Witnesses:
ROBT. W. NEWGEL,
CHARLES H. WEIDNER.

Copies of this patent may be obtained for five cents each, by addressing the "Commissioner of Patents, Washington, D. C."